United States Patent
Klein, Jr.

[11] Patent Number: 5,927,431
[45] Date of Patent: Jul. 27, 1999

[54] GUARDED SNAP HOOK

[76] Inventor: Richard T. Klein, Jr., 7200 McCormick Blvd., Chicago, Ill. 60659

[21] Appl. No.: 08/791,993

[22] Filed: Jan. 31, 1997

[51] Int. Cl.$^6$ .................................................. A44B 13/00
[52] U.S. Cl. .................................. 182/3; 182/9; 24/599.7
[58] Field of Search ........................ 182/3, 9; 24/599.5, 24/599.6, 599.7, 600.1, 600.3; 294/82.19, 82.2

[56] References Cited

U.S. PATENT DOCUMENTS

| | | | |
|---|---|---|---|
| 644,699 | 3/1900 | Woodford | 294/82.2 |
| 684,419 | 10/1901 | Farmer | 24/241 |
| 797,941 | 8/1905 | Corbett | 24/599.4 |
| 909,782 | 1/1909 | Gibson | 24/265 |
| 1,209,615 | 12/1916 | Obsboum | 24/599.5 |
| 1,677,592 | 7/1928 | Lloyd | 24/600.9 |
| 1,755,286 | 6/1930 | Davis et al. | 24/241 |
| 1,794,694 | 3/1931 | Jensen et al. | 24/241 |
| 1,879,167 | 9/1932 | Freysinger | 24/241 |
| 1,879,168 | 9/1932 | Freysinger | 24/599.7 |
| 1,949,608 | 3/1934 | Johnson | 24/599.7 |
| 1,964,428 | 6/1934 | Duffy . | |
| 1,985,596 | 12/1934 | Burnham | 24/241 |
| 2,412,895 | 12/1946 | Lewis | 24/265 |
| 2,490,931 | 12/1949 | Thompson | 24/241 |
| 2,514,656 | 7/1950 | Manson | 24/241 |
| 2,706,318 | 4/1955 | Coffing . | |
| 2,791,817 | 5/1957 | Burnham | 24/241 |
| 3,105,280 | 10/1963 | Davis | 24/234 |
| 3,213,508 | 10/1965 | Vigerhed . | |
| 3,918,758 | 11/1975 | Fournier | 24/241 |
| 4,062,092 | 12/1977 | Tamada | 24/241 SB |
| 4,122,585 | 10/1978 | Sharp | 24/241 SB |
| 4,434,536 | 3/1984 | Schmidt | 24/241 PP |
| 4,528,728 | 7/1985 | Schmidt et al. | 24/241 P |
| 4,528,729 | 7/1985 | Schmidt et al. | 24/241 P |
| 4,539,732 | 9/1985 | Wolner | 24/241 R |
| 4,546,523 | 10/1985 | Bailey | 24/241 |
| 4,621,851 | 11/1986 | Bailey | 294/82.2 |
| 4,835,823 | 6/1989 | Contat | 24/234 |
| 4,923,048 | 5/1990 | Cole | 182/9 |
| 4,977,647 | 12/1990 | Casebolt | 24/599.5 |
| 5,480,202 | 1/1996 | Gloden | 294/82.2 |

FOREIGN PATENT DOCUMENTS

| | | | |
|---|---|---|---|
| 462790 | 12/1913 | France | 24/599.7 |
| 240426 | 11/1911 | Germany | 24/600.1 |
| 176163 | 8/1961 | Sweden | 24/599.7 |
| 1078645 | 8/1967 | United Kingdom | 24/599.7 |

Primary Examiner—Alvin Chin-Shue
Attorney, Agent, or Firm—Lockwood, Alex, Fitzgibbon & Cummings

[57] ABSTRACT

A keeper-equipped snap hook includes a guard member which can be readily positioned by a user in either a closed position or an open position. In the closed position the keeper is secured in a U-shaped channel provided by the guard member to protect the keeper from unintended or inadvertent actuation. In the open position the keeper is exposed for ready activation to an open position by the user to either install the snap hook on or remove the snap hook from a D-ring or the like. A cam actuator in the hook body and a camming surface on the guard member interact to bias the guard member in the open and closed positions for ease of use during installation or removal of the snap hook.

37 Claims, 6 Drawing Sheets

GUARDED SNAP HOOK

BACKGROUND OF THE INVENTION

The present invention relates to snap hooks of the type used in conjunction with positioning straps, lanyards and other personal fall protection devices used by linemen, window washers and other climbers while working at elevated work sites. More particularly, the invention relates to a keeper-equipped snap hook having a guard member which can be intentionally placed in an open position by the climber to allow ready actuation of the keeper and release of the hook, or intentionally placed in a closed position to prevent inadvertent actuation of the keeper and consequent release of the hook.

Snap hooks have come into wide use in connection with personal fall protection systems. One such fall protection system utilizes a positioning or pole strap to support a climber hands-free on a wooden pole or I-beam. The positioning strap is typically secured by a snap hook to a D-ring on a body belt on one side of the climber, passed around the pole or I-beam and secured by a snap hook to another D-ring on the other side of the climber. The climber can lean back supported by the strap and work hands free.

Another personal fall protection system utilizes a fall arrest lanyard designed to arrest a climber in a fall from an elevated work position. The lanyard, which is typically secured at one end to a support structure above the climber, is secured at its other end by a snap hook to a D-ring centered on a full body harness worn by the climber. In other systems wherein the lanyard is secured to a winch, the lanyard functions as a winch cable and can be used to suspend the user at an elevated work site, or to rescue the user from such a site.

Snap hooks used in these applications must not only be compatible with other components of the personal fall prevention system, and capable of supporting the weight of the climber, but must also be capable of being intentionally engaged and disengaged by the climber. One of the benefits of single-locking keepers is their ease of intentional engagement and disengagement.

Snap hooks designed for use with personal fall protection systems typically incorporate a metallic body formed with an open hook at one end, and a keeper, which closes the mouth of the hook to prevent unintentional removal of the hook from a D-ring. Typically in its single-locking form, the keeper comprises an arm which is pivotally mounted to the hook body and spring-biased into engagement with the tip of the hook. To install or remove the snap hook from, for example, a D-ring, the climber must first displace the keeper away from the hook tip to open the mouth of the hook so that the D-ring can pass through the mouth.

In its double-locking form, the keeper is similar to the single-locking keeper described above but includes a secondary latch element. In order to engage or disengage the hook, the double-locking keeper requires the climber to manually depress both the keeper and the secondary latch. The secondary manipulation that is required to intentionally engage and disengage the snap hook provides an additional measure of protection against an accidental disengagement of the snap hook.

In contrast, the present invention provides a snap hook having a single-locking keeper which can be readily released by the climber, wherein the keeper is protected from unintended or inadvertent release by a novel guard member. In particular, the guard member, which can be actuated by the climber at any time from an open position providing ready access to the keeper, to a closed position shielding the keeper from actuation, is U-shaped in cross-section so as to form a channel within which the keeper is received and protected when the guard member is closed.

Accordingly, it is a general object of the present invention to provide a new and improved snap hook.

It is a more specific object of the present invention to provide a snap hook of the type having a single-locking keeper which has an additional measure of protection against unintended or inadvertent actuation of the keeper.

It is another more specific object of the present invention to provide an improved snap hook of the type having a single keeper wherein a guard member protecting the keeper can be selectively positioned by a climber in a closed position, which not only prevents unintentional actuation of the keeper, but also protects the keeper from wear and damage; or in an open position, allowing ready actuation of the keeper to open the snap hook.

SUMMARY OF THE INVENTION

The invention is directed to a snap hook comprising an elongated body member including a ring-engaging portion at one end and a strap- or lanyard-engaging connecting portion at the other end, the ring-engaging end including an open hook-shaped tip defining a ring-receiving slot, a keeper pivotally secured at one end to the body member between the ring and strap portions, and extending to the hook-shaped tip to close the ring-receiving slot, and a guard member pivotally secured at one end to the body member and extending to an outside surface of the hook-shaped tip, the guard member being adapted in a closed position to receive and enclose the exposed end of the keeper to prevent displacement thereof by an externally applied force.

BRIEF DESCRIPTION OF THE DRAWINGS

The features of the present invention which are believed to be novel are set forth with particularity in the appended claims. The invention, together with the further objects and advantages thereof, can best be understood by reference to the following description taken in conjunction with the accompanying drawings, in the several figures of which like reference numerals identify like elements, and in which:

DESCRIPTION OF THE PREFERRED EMBODIMENT

Figure 1:
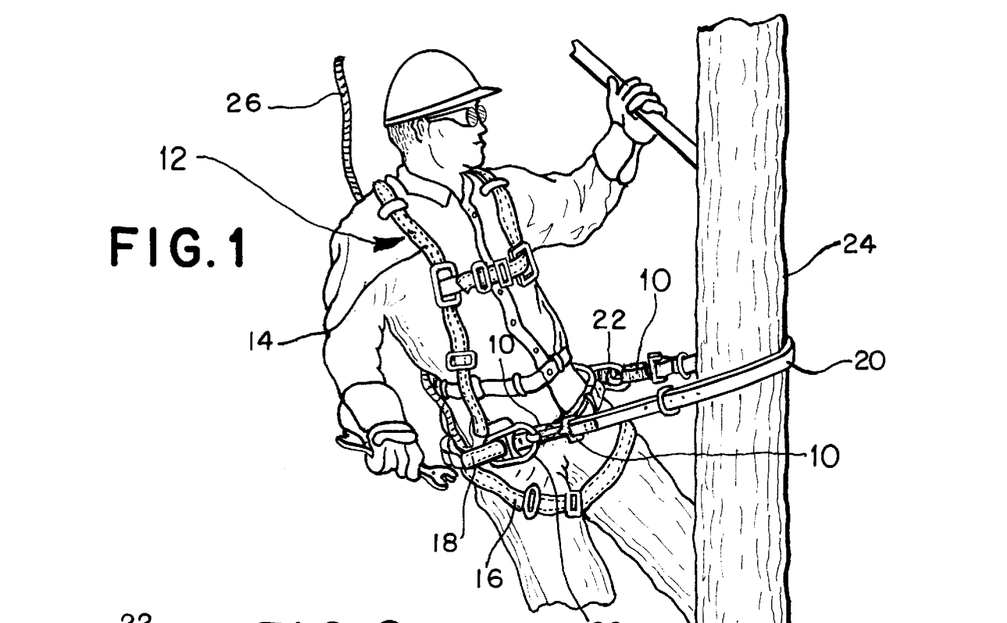
FIG. 1 is a perspective view of a climber utilizing a personal fall protection system incorporating a body belt, a positioning strap and multiple snap hooks constructed in accordance with the invention.

Referring to the Figures, and particularly to FIG. 1, a snap hook 10 constructed in accordance with the invention is shown as a component of a lineman's fall protection system. The protection system includes, in accordance with conventional practice, a full body harness 12 which includes shoulder straps 14 and leg straps 16, a body belt 18, and a positioning strap 20 (also referred to as a pole strap). The body belt 18 may be permanently joined to or separate from harness 12. Where a full body harness is not utilized, only body belt 18 may be utilized in conjunction with positioning strap 20 and snap hooks 10.

In accordance with conventional practice, body belt 18 includes a pair of D-rings 22 of conventional construction arranged on opposite sides of the lineman's waist. To engage these D-rings, positioning strap 20 includes snap hooks 10 permanently attached to the strap at each end by conventional techniques.

In use, positioning strap 20 is wrapped around a supporting pole 24 and the ends of the strap are detachably joined to respective D-rings by individual snap hooks 10. This allows a climber to position himself on the pole (or I-beam) and allow for hands-free work or to detach himself in the event of an emergency. As further shown in FIG. 1, but best described in FIG. 12, a fall arresting rope-type lanyard 26 may also be attached to body harness 12 by another snap hook. The other end of this lanyard is affixed to a support structure such that the lanyard will arrest the climber in the event of a fall.

Figure 2:
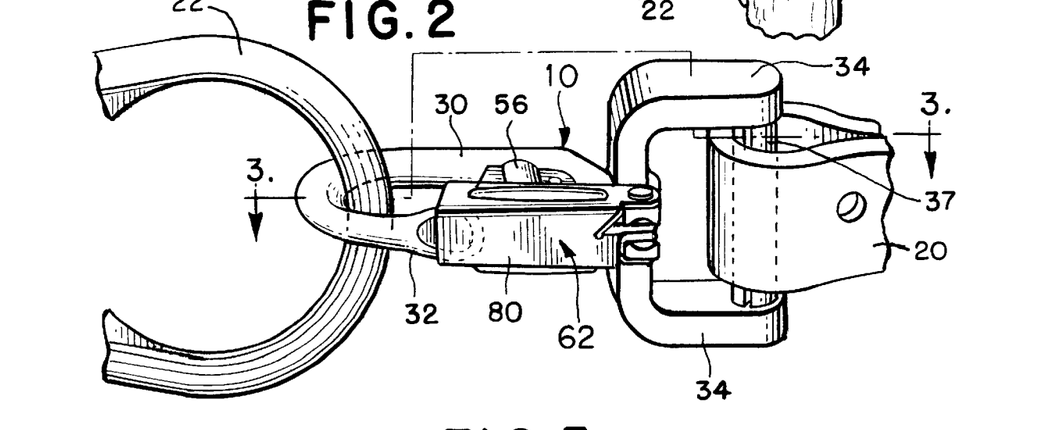
FIG. 2 is an enlarged perspective view of one of the snap hooks of FIG. 1.
Figure 3:
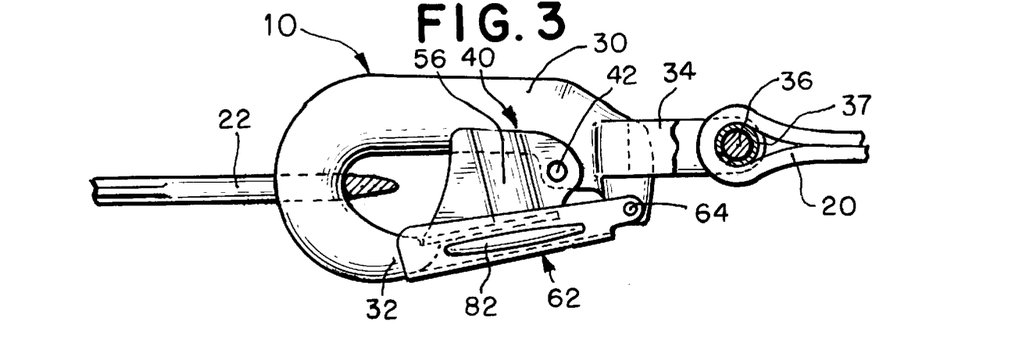
FIG. 3 is a side elevational view, partially in cross-section, of the snap hook of FIG. 2 in a closed and guarded condition taken along line 3—3 of FIG. 2.
Figure 4:
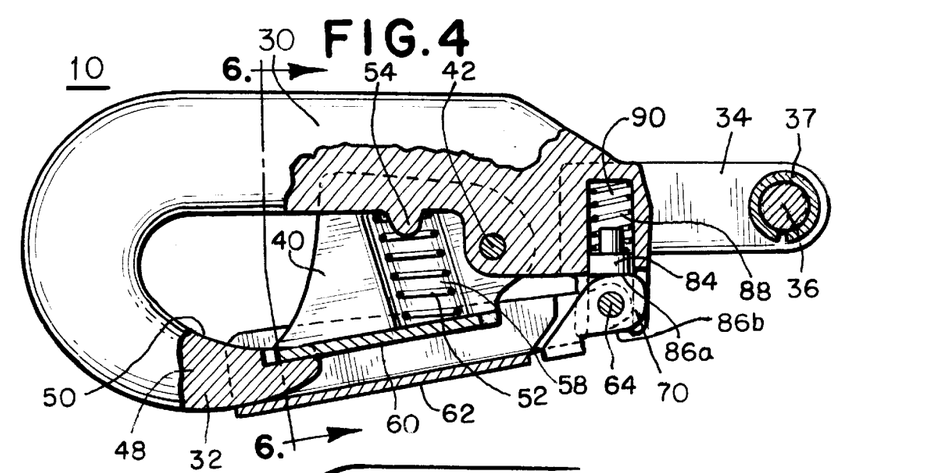
FIG. 4 is an enlarged side elevational view of the snap hook of FIG. 3 partially in section to better illustrate principal component parts of the hook in a closed and guarded condition.

Referring now to FIGS. 2–4, snap hook 10 is seen to include an elongated body member 30 having a hook-shaped ring-engaging portion at one end and a strap-engaging connecting portion at its other end. The hook-shaped end portion has a generally semi-circular shape and includes a tip portion 32. The connecting end portion is in the form of a stirrup having a pair of spaced projections 34 and a cylindrical connecting portion 36, and includes a cylindrical sleeve 37 fitted over connecting portion 36 for receiving positioning strap 20.

Figure 4A:
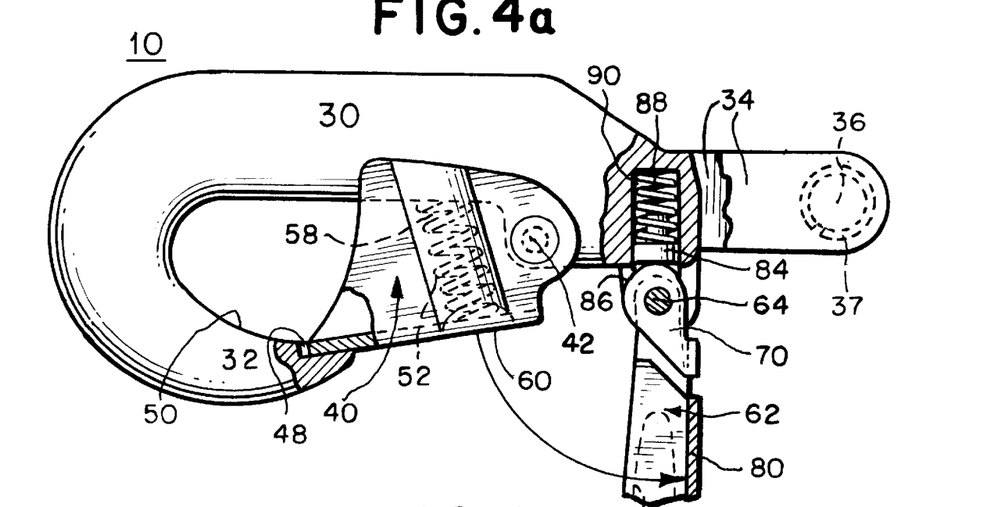
FIG. 4a is an enlarged side elevational view similar to that of FIG. 4 showing the guard member of the snap hook being moved from a closed position toward an open position.
Figure 4B:
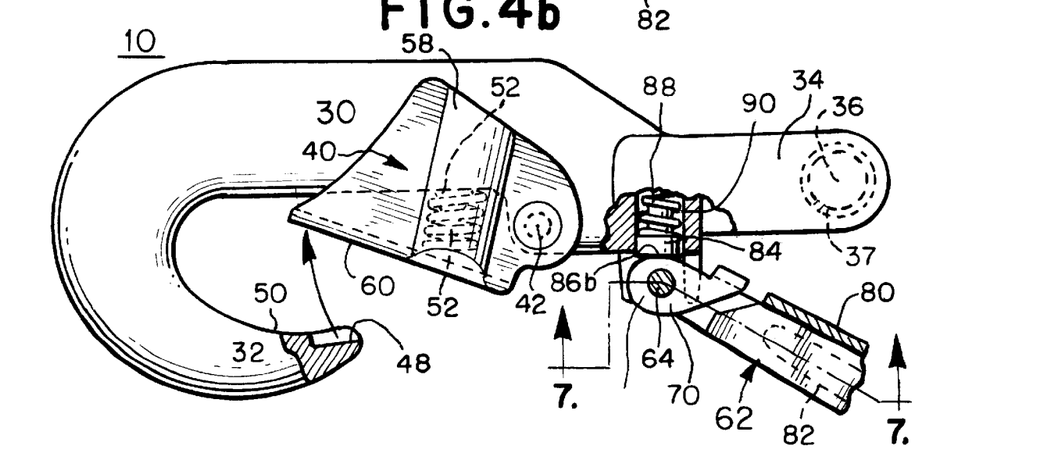
FIG. 4b is an enlarged side elevational view similar to that of FIG. 4 showing the guard member of the snap hook in an open position and the keeper actuated to open the hook.
Figure 5:
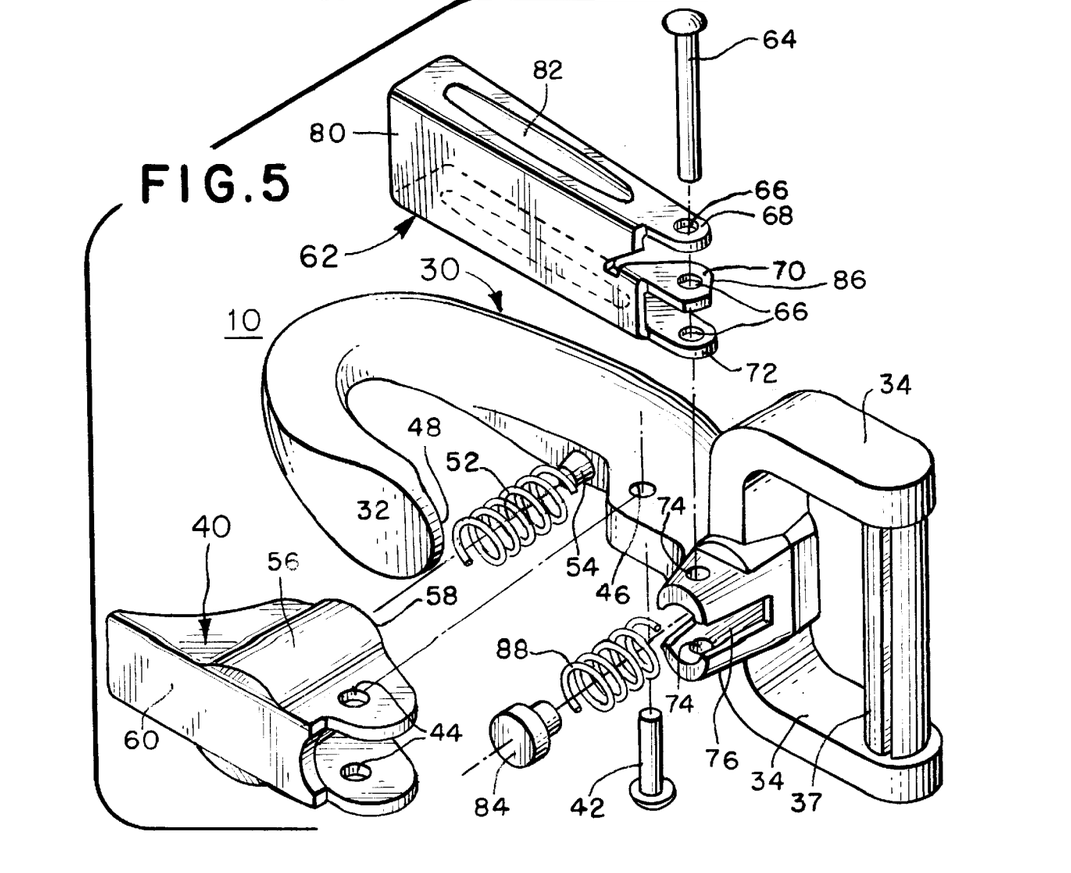
FIG. 5 is an exploded perspective view showing certain principal component parts of the snap hook.
Figure 6:
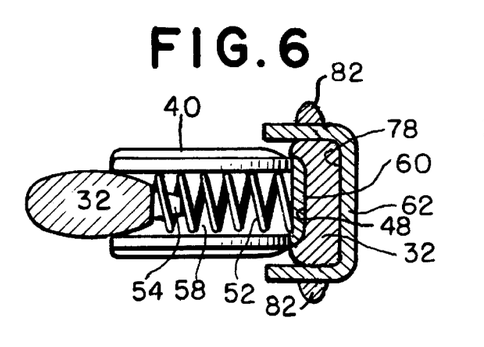
FIG. 6 is a cross-sectional view of the tip portion of the snap hook taken along line 6—6 of FIG. 4.
Figure 7:
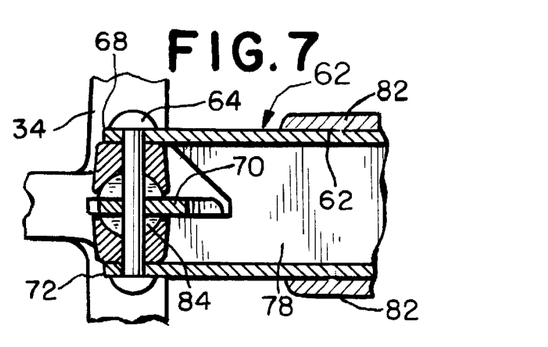
FIG. 7 is a cross-sectional view taken along line 7—7 of FIG. 4b of a portion of the guard member showing its pivotal mounting to the body of the snap hook.

To prevent D-ring 22 from disengaging from snap hook 10, the hook includes a keeper 40 pivotally mounted to body member 30 by a pin 42 (FIG. 5) extending through an aperture 44 in the keeper and an aperture 46 in the body member. Thus mounted, keeper 40 is constrained to pivot between a closed position spanning the mouth of the hook to engage a recess 48 provided on the inside surface 50 of hook tip portion 32, as shown in FIG. 4a, and an open position wherein the keeper is spaced from the tip and the mouth of the hook is open as shown in FIG. 4b. As best shown in FIG. 6, the keeper 40 is generally U-shaped in cross-section, and of complimentary dimensions to recess 48.

A helical spring 52 provided within the interior of keeper 40 engages a projection 54 (FIG. 5) on body member 30 at one end, and the inside surface of keeper 40 at its other end to bias the keeper into engagement with recess 48. A pair of opposed outwardly projecting cylindrical deformations 56 in the sidewalls of keeper 40 form a recess 58 (FIG. 4) within the keeper for receiving and maintaining in alignment helical spring 52. A flat exterior surface 60 on keeper 40 provides the climber with a convenient actuating surface for opening the keeper.

Upon actuation, keeper 40 pivots between the closed position shown in FIG. 4a and the open position shown in FIG. 4b. In the open position, the mouth of the hook end portion is open, allowing a D-ring to be readily removed.

To prevent unintended or inadvertent actuation of keeper 40, snap hook 10 includes, in accordance with one aspect of the invention, a guard member 62 which, when closed, overlies keeper 40 to prevent such unintended or inadvertent actuation. In particular, guard member 62 is pivotally mounted to body member 30 by means of a pin 64 (FIG. 5) which extends through three apertures 66 provided in three projecting flange portions 68, 70 and 72 formed at the pivot end of guard member 62, and an aperture 74 extending through a mounting boss 76 integrally formed in body member 30. Thus mounted, guard member 62 is constrained to pivot between the closed position shown in FIG. 4 and the open position shown in FIG. 4b. Since the guard member is U-shaped in cross-section, as best shown in FIG. 6, when closed the actuating surface 60 of keeper 40 is contained within the channel 78 formed by the guard.

The flat external surface 80 of guard member 62 provides a convenient highly visible surface for informational or product-identifying indicia. For additional convenience to the user in positioning the guard member a pair of integrally-formed wing-like projections 82 may be provided on the sides of the guard member.

In accordance with another aspect of the invention, guard member 62 may be provided with indexing means in the form of a cam 84 in base member 30 and a camming surface 86 on the guard member to alternatively index the guard member in its open and closed positions. In particular, cam 84 is biased into engagement with camming surface 86 by a helical spring 88 situated within a bore-shaped recess 90 in boss 76. Camming surface 86, which is formed on the edge of the central projecting flange portion 70 of guard member 62, includes two flat segments 86a and 86b. Segment 86a (FIG. 4) is engaged by cam 84 when guard member 62 is closed, to bias the guard member closed, and segment 86b (FIG. 4b) is engaged by cam 84 when the guard member is open, to bias the guard member open. Flange portions 68 and 72 have no camming surfaces, and only serve to establish the pivot axis of the guard member.

The snap hook of FIGS. 1–7 is ideally suited for attaching a positioning strap to a full body harness or separate body belt. By reason of the unique indexing of the guard member in open and closed positions a user can open the guard member prior to installing the hook on or removing the hook from a D-ring. Moreover, once the D-ring has been received by the hook, all that is necessary is for the user to snap the guard member closed, thereby preventing subsequent inadvertent actuation of the keeper.

Figure 8:
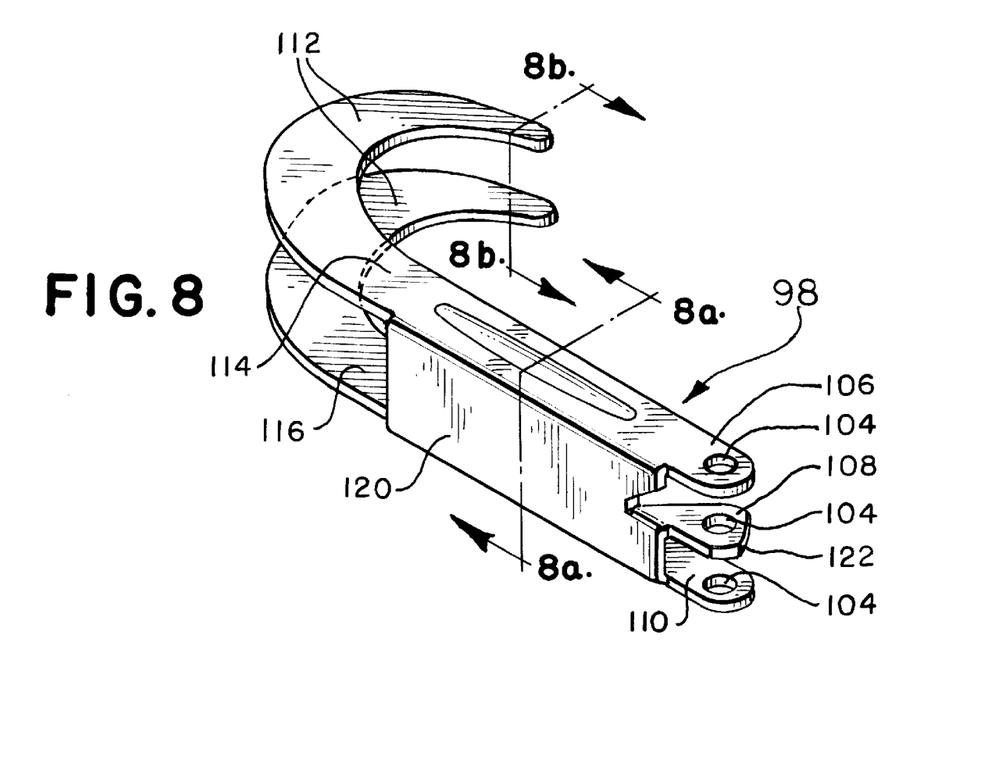
FIG. 8 is a perspective view of an alternative form of guard member particularly well suited for use in a snap hook used in conjunction with a fall arrest lanyard.
Figure 8A:
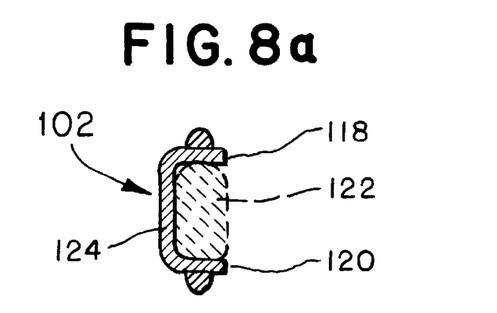
FIG. 8a is a cross-sectional view taken along line 8a—8a of FIG. 8.
Figure 8B:
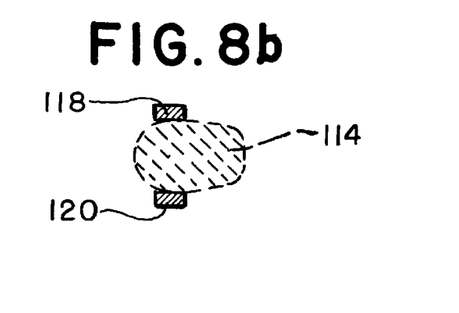
FIG. 8b is a cross-sectional view taken along line 8b—8b of FIG. 8.
Figure 9:
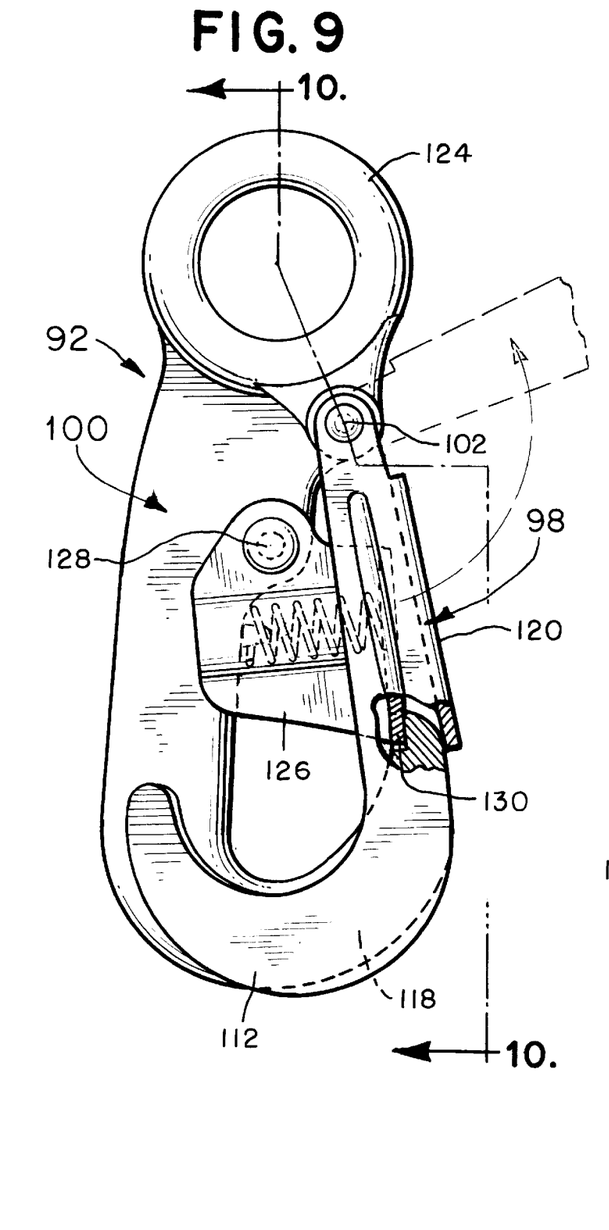
FIG. 9 is a side elevational view of an alternative embodiment of the invention incorporating the guard member of FIG. 8.
Figure 10:
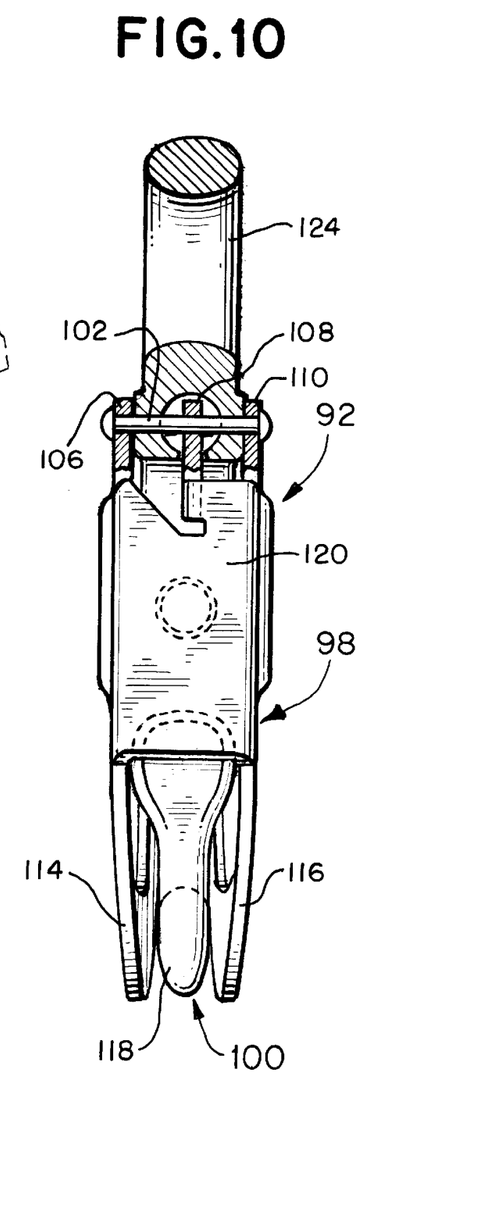
FIG. 10 is a top plan view of the alternative embodiment of FIG. 9 taken along lines 10—10 of FIG. 9.
Figures 11, 12:
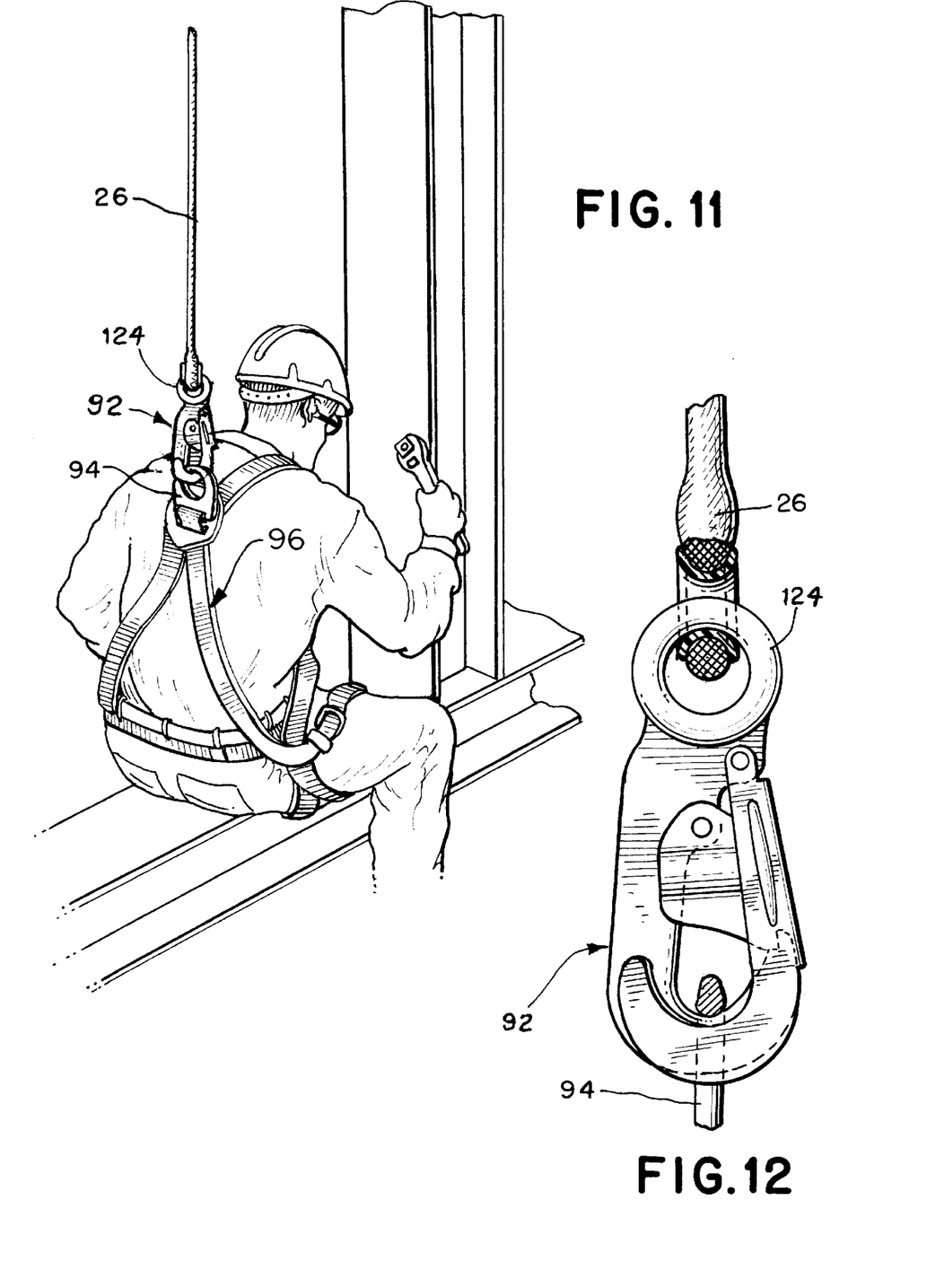
FIG. 11 is a perspective view of a climber utilizing a personal fall protection system incorporating a body harness, fall arrest lanyard and snap hook.
FIG. 12 is an enlarged perspective view of the snap hook of FIG. 11.

Referring to FIGS. 8–11, an alternate embodiment of the invention comprises a snap hook 92 for use at the end of a safety lanyard for engaging a D-ring 94 on a body harness 96 (FIG. 11). As seen in FIG. 9, snap hook 92 includes an elongated guard member 98 pivotally mounted to an elongated body member 100 by a pin 102 extending through apertures 104 (FIG. 8) in three projecting flange portions 106, 108 and 110 at the pivot end of the member. The body member 100 of snap hook 92 may be otherwise identical to body member 30 in the snap hook described in FIGS. 1–7.

Guard member 98 differs from guard member 62 of FIGS. 1–7 primarily at the ends 112 of its side members 114 and 116 (FIG. 8), which are each seen to be formed generally in the form of a hook. When guard member 98 is closed (as shown in FIGS. 9 and 10), the hooked ends 112 enclose the hook end 118 of body member 100. A flat surface 120 is provided by that portion of guard member 98 which extends between side members 114 and 116. As with guard member 62, a camming surface 122 on flange 108 operates in conjunction with a spring-biased cam (not shown) to index the guard member in open and closed positions.

Body member 100 includes a closed ring-shaped connecting end portion 124 for receiving the lanyard, which may be attached to the ring by conventional techniques. A keeper 126 is pivotally mounted by a pin 128 to the body member and biased against the tip 130 of the hook end by a helical spring (not shown) to close the mouth of the hook in the absence of an external force applied by the user.

As shown in FIGS. 8a and 8b, guard member 98 is U-shaped in cross-section, and is dimensioned to receive and generally enclose keeper 126 when closed. This prevents keeper 126 from being inadvertently actuated while a D-ring is connected.

In use, and referring to FIGS. 11 and 12, snap hook 98 is permanently attached at its closed ring-shaped connecting end 124 to a rope-type lanyard. The hook end is secured to D-ring 94, typically incorporated at a central location on body harness 96. In the event the climber falls, the lanyard arrests the worker's fall through the hook and D-ring.

The hook body member may be forged with 8640 steel. The other components of the snap hook, including the keeper and guard, may be formed of a cold rolled steel.

It will be appreciated that the snap hook of the invention can be constructed in various sizes to accommodate a wide range of uses. While particular embodiments of the invention have been shown and described, it will be obvious to those skilled in the art that changes and modifications may be made therein without departing from the invention in its broader aspects, and, therefore, the objective in the appended claims is to cover all such changes and modifications as fall within the true spirit and scope of the invention.

I claim:

1. A snap hook comprising:

an elongated body member including a ring-engaging portion at one end and a connecting portion at the other end;

said ring-engaging portion including an open hook-shaped tip defining a ring-receiving slot;

a keeper pivotally secured at one end to said body member, and having an open position allowing access to said ring-receiving slot, and a closed position extending to said hook-shaped tip to close said ring-receiving slot;

a guard member pivotally secured at one end to said body member and having an open position allowing access to said keeper and a closed position extending to said hook-shaped tip;

said guard member adapted in said closed position to at least partially receive and enclose said keeper to prevent displacement of said keeper by an externally applied force;

said guard member being actuable between said open and closed positions independently of the position of said keeper; and means for indexing said guard member in said open position, said indexing means comprising a camming surface on one of said members, and a cooperating camming member on the other of said members.

2. A snap hook as defined in claim 1 wherein in said closed position said keeper is spring-biased into engagement with the inside surface of said hook-shaped tip.

3. A snap hook as defined in claims 1 or 2 wherein said guard member is spring-biased into engagement with the outside surface of said hook-shaped tip in said closed position.

4. A snap hook as defined in claim 1 wherein said indexing means comprise a camming surface on said guard member having a detent portion corresponding to said open position of said guard member, and a camming member on said body member spring-biased into engagement with said camming surface whereby said detent portion indexes said guard member in said open position.

5. A snap hook as defined in claim 4 wherein said body member includes a recess radially aligned relative to the pivot axis of said guard member, and said camming member and spring are disposed within said recess whereby said spring biases said camming member into engagement with said camming surface.

6. A snap hook as defined in claim 1 or 4 wherein said guard member includes at least a pair of flange portions, said body member includes a mounting hub portion, said flange and hub portions each include apertures aligned along the pivot axis of said guard member, and said snap hook includes a pin extending through said apertures for pivotally mounting said guard member to said body member.

7. A snap hook as defined in claim 1 wherein said guard member is generally U-shaped in cross-section and forms a channel for at least partially receiving said keeper.

8. A snap hook as defined in claim 1 wherein said keeper and said guard member are constrained to pivot in a plane passing generally through the longitudinal center line of the body member.

9. A snap hook as defined in claim 1 wherein said guard member includes a pair of laterally projecting handle portions.

10. A snap hook as defined in claim 1 wherein the engaging end of said guard member includes a hook-shaped portion generally corresponding to and overlying said hook-shaped end portion of said body member.

11. A snap hook as defined in claim 10 wherein said guard member is generally U-shaped in cross-section and forms a channel for receiving at least a portion of said keeper and said hook-shaped tip portion of said body member.

12. A snap hook as defined in claim 1 wherein said hook-shaped end of said body member is wider than the engaging end of said keeper and includes a notch-shaped recess for receiving said engaging end.

13. A snap hook as defined in claim 1 wherein said keeper is generally U-shaped in cross-section to form a channel and wherein a spring is disposed within said channel to engage said body member at one end and said keeper at the other end to bias said keeper into engagement with said hook-shaped tip.

14. A snap hook as defined in claim 13 wherein at least one sidewall of said keeper is deformed to define a space within said channel for receiving said spring.

15. A snap hook as defined in claim 1 wherein said camming surface further includes an additional detent portion corresponding to said closed position of said cover member, whereby said additional detent portion indexes said guard member in said closed position.

16. A snap hook as defined in claim 1 wherein said keeper is pivotal about a first point and said guard is pivotal about a second point spaced-apart from said first point.

17. A snap hook comprising:
an elongated body member including a ring-engaging portion at one end and a connecting portion at the other end;
said ring-engaging portion including an open hook-shaped tip defining a ring-receiving slot;
a keeper pivotally secured at one end to said body member, and having an open position allowing access to said slot and spring-biased into engagement with an inside surface of said hook-shaped tip to close said ring-receiving slot;
a guard member pivotally secured at one end to said body member and having an open position allowing access to said keeper and spring biased into engagement with the outside surface of said hook-shaped tip in a closed position;
said guard member being generally U-shaped in cross-section to at least partially receive and enclose said keeper when in said closed position to prevent displacement of said keeper by an externally applied force;
said guard member being actuable between said open and closed positions independently of the position of said keeper; and
means for indexing said guard member in said open position, said indexing means comprising a camming surface on one of said members, and a cooperating camming member on the other of said members.

18. A snap hook as defined in claim 17 wherein said indexing means comprise a camming surface on said guard member having a detent portion corresponding to said open position of said guard member, and a camming member on said body member spring-biased into engagement with said camming surface whereby said detent portion indexes said guard member in said open position.

19. A snap hook as defined in claim 17 wherein said guard member includes at least a pair of flange portions, said body member includes a mounting hub portion, said flange and hub portions each include apertures aligned along the pivot axis of said guard member, and said snap hook includes a pin extending through said apertures for pivotally mounting said guard member to said body member.

20. A snap hook as defined in claim 19 wherein said body member includes a recess radially aligned relative to the pivot axis of said guard member, and said camming member and spring are disposed within said recess whereby said spring biases said camming member into engagement with said camming surface.

21. A snap hook as defined in claim 17 wherein the engaging end of said guard member includes a hook-shaped portion generally corresponding to and overlying said hook-shaped end portion of said body member.

22. A snap hook as defined in claim 17 wherein said hook-shaped end of said body member is wider than the engaging end of said keeper and includes a notch-shaped recess for receiving said engaging end.

23. A personal fall protection system comprising:
a body belt adapted to extend around the waist of a user;
said body belt having at least one D-ring thereon at one side of the user's waist;
a positioning strap attached at one end to said body belt at the other side of the user's waist;
a snap hook at the other end of said positioning strap;
said snap hook including an elongated body member including a ring-engaging portion at one end and a connecting portion attached to said positioning strap at the other end;
said ring-engaging portion including an open hook-shaped tip defining a ring-receiving slot;
a keeper pivotally secured at one end to said body member and having an open position allowing access to said slot, and a closed position extending to said hook-shaped tip to close said ring-receiving slot;
a guard member pivotally secured at one end to said body member and extending to said hook-shaped tip;
said guard member being adapted in said closed position to at least partially receive and enclose said keeper to prevent displacement of said keeper by an externally applied force;
said guard member being actuable between said open and closed positions independently of the position of said keeper; and
means for indexing said guard member in said open position, said indexing means comprising a camming surface on one of said members, and a cooperating camming member on the other of said members.

24. A personal fall protection system as defined in claim 23 wherein said keeper is spring-biased into engagement with the inside surface of said hook-shaped tip, and said guard member is spring-biased into engagement with the outside surface of said hook-shaped tip when in said closed position.

25. A personal fall protection system as defined in claim 24 wherein said indexing means comprise a camming surface on said guard member having detent surfaces corresponding to said open and closed positions, and a camming member on said body member spring-biased into engagement with said camming surface whereby said detent surfaces maintain said guard member in either said open or said closed positions.

26. A personal fall protection system as defined in claim 23 wherein said guard member is generally U-shaped in cross-section and forms a channel for at least partially receiving said keeper.

27. A personal fall protection system as defined in claim 23 wherein said guard member includes at least a pair of flange portions, said body member includes a mounting hub portion, said flange and hub portions each include apertures aligned along the pivot axis of said guard member, and said snap hook includes a pin extending through said apertures for pivotally mounting said guard member to said body member.

28. A personal fall protection system as defined in claim 23 wherein said body member of said snap hook includes a recess radially aligned relative to the pivot axis of said guard member, and said camming member and spring are disposed within said recess whereby said spring biases said camming member into engagement with said camming surface.

29. A personal fall protection system as defined in claim 23 wherein said guard member includes a pair of laterally projecting handle portions.

30. A personal fall protection system as defined in claim 23 wherein said guard member is generally U-shaped in cross-section and forms a channel for at least partially receiving said keeper and said hook-shaped tip portion of said body member.

31. A personal fall protection system as defined in claim 23 wherein said hook-shaped end of said body member is wider than the engaging end of said keeper and includes a notch-shaped recess for receiving said engaging end.

32. A personal fall protection system as defined in claim 23 wherein said keeper is generally U-shaped in cross-section to form a channel and wherein a spring is disposed within said channel to engage said body member at one end and said keeper at the other end to bias said keeper into engagement with said hook-shaped tip.

33. A snap hook comprising:

an elongated body member including a ring-engaging portion at one end and a connecting portion at the other end;

said ring-engaging portion including an open hook-shaped tip defining a ring-receiving slot;

a keeper pivotally secured at one end to said body member, and extending to said hook-shaped tip to close said ring-receiving slot, said keeper being spring-biased into engagement with the inside surface of said hook-shaped tip;

a guard member pivotally secured at one end to said body member and extending in a closed position to said hook-shaped tip, said guard member being spring-biased into engagement with the outside surface of said hook-shaped tip in said closed position;

means for indexing said guard member in said open position, said indexing means comprising a camming surface on said guard member having a detent surface corresponding to said open positions, and a camming member on said body member spring-biased into engagement with said camming surface whereby said detent surface maintains said guard member in said open position; and said guard member adapted in said closed position to at least partially receive and enclose said keeper to prevent displacement of said keeper by an externally applied force.

34. A snap hook as defined in claim 33 wherein said body member includes a recess radially aligned relative to the pivot axis of said guard member, and said camming member and spring are disposed within said recess whereby said spring biases said camming member into engagement with said camming surface.

35. A snap hook as defined in claim,34 wherein said guard member includes at least a pair of flange portions, said body member includes a mounting hub portion, said flange and hub portions each include apertures aligned along the pivot axis of said guard member, and said snap hook includes a pin extending through said apertures for pivotally mounting said guard member to said body member.

36. A snap hook as defined in claim 35 wherein said guard member is generally U-shaped in cross-section and forms a channel for receiving at least a portion of said keeper and said hook-shaped tip-portion of said body member.

37. A snap hook as defined in claim 1, 17 or 24 wherein said one of said members includes a recess radially aligned relative to the pivot axis of said other member, and said camming member and said spring are disposed within said recess whereby said spring biases said camming member into engagement with said camming surface.

* * * * *